United States Patent

Harada et al.

[11] Patent Number: 5,340,150
[45] Date of Patent: Aug. 23, 1994

[54] INFLATOR FOR AIR BAG

[75] Inventors: Tadamasa Harada; Midori Sakamoto; Noriaki Nakashima, all of Nobeoka, Japan

[73] Assignee: Asahi Kasei Kogyo Kabushiki Kaisha, Japan

[21] Appl. No.: 820,609
[22] PCT Filed: Jul. 16, 1991
[86] PCT No.: PCT/JP91/00944
§ 371 Date: Jan. 28, 1992
§ 102(e) Date: Jan. 28, 1992
[87] PCT Pub. No.: WO92/01589
PCT Pub. Date: Feb. 6, 1992

[30] Foreign Application Priority Data

Jul. 16, 1990 [JP] Japan .................. 2-185334

[51] Int. Cl.$^5$ ............................ B60R 21/26
[52] U.S. Cl. ...................... 280/740; 280/741
[58] Field of Search ........... 280/736, 740, 741, 742, 280/728 R; 102/530, 531; 422/164, 167, 165, 166

[56] References Cited

U.S. PATENT DOCUMENTS

| | | | |
|---|---|---|---|
| 3,985,076 | 10/1976 | Schneiter et al. | 280/741 |
| 3,986,456 | 10/1976 | Doin et al. | 280/741 |
| 4,578,247 | 3/1986 | Bolieau | 280/741 |
| 4,590,041 | 5/1986 | Hill | 280/741 |
| 5,000,479 | 3/1991 | Werner et al. | 280/741 |
| 5,062,367 | 11/1991 | Hayashi et al. | 280/741 |
| 5,106,119 | 4/1992 | Swann et al. | 280/741 |

FOREIGN PATENT DOCUMENTS

| | | | |
|---|---|---|---|
| 61-108034 | 5/1986 | Japan . | |
| 04-66348 | 3/1992 | Japan | 280/736 |

Primary Examiner—Karin L. Tyson
Attorney, Agent, or Firm—Finnegan, Henderson, Farabow, Garrett & Dunner

[57] ABSTRACT

An inflator for an air bag includes a pressure vessel formed by a cylindrical upper vessel body having a mirror plate, a cylindrical lower vessel body having a mirror plate, and an essentially cylindrical partitioning wall disposed within the pressure vessel for defining a gas generating chamber. The partitioning wall comprises an upper partitioning wall (4) tightly fitted to the mirror plate (2) of the upper vessel body and a lower partitioning wall (5) tightly fitted to the mirror plate (3) of the lower vessel body. The mating ends (4a, 5a) of the upper partitioning wall (4) and the lower partitioning wall (5) are slidably overlapped.

4 Claims, 2 Drawing Sheets

INFLATOR FOR AIR BAG

TECHNICAL FIELD

The present invention relates to an inflator for an air bag protecting a passenger upon an occurrence of an accident, such as collision of an automotive vehicle with an obstacle.

BACKGROUND ART

An air bag able to be rapidly expanded upon the occurrence of a collision of an automotive vehicle or the like to thus protect a passenger, is known. Conventionally, the rapid expansion of the air bag is caused by a high-speed discharge of a gas generated by burning a solid state gas generating material. As a typical solid state gas generating material, a material containing metallic azide generating a non-toxic nitrogen gas is used. The metallic azide produces a residual decomposition product and a large amount of reaction heat during the generation of the gas.

To properly activate the air bag upon a collision of the vehicle with an obstacle, it is necessary to produce an amount of approximately 30 to 100l of gas at a driver's seat and an amount of approximately 150 to 200l of gas for a passenger's seat, in a very short time, and accordingly, the inner pressure in an inflator should be at a high level, to thereby obtain a high speed burning of the gas generating material. This, however, requires that the thickness of a wall of a pressure vessel of the inflator be sufficient to withstand such a high pressure, and thus increases the weight of the inflator.

Various types and constructions of inflators have been disclosed in the prior art.

For example, an inflator 20 disclosed in U.S. Pat. No. 4,547,342, and shown in FIG. 1, comprises a pressure vessel 20 formed by welding an upper mirror plate 21 and a lower mirror plate 22, respectively having cylindrical portions 33 extending from the peripheral edges thereof, at the ends of these cylindrical portions 33. A cylindrical partitioning wall 23 is extended downward along an axis of the pressure vessel 20 from the upper mirror plate 21 in an inside of the pressure vessel 20, and at a position corresponding to the partitioning wall 23, a cylindrical partitioning wall 24 is extended upward from the lower mirror plate 22. The tip ends of the partitioning walls 23 and 24 are welded together to thereby define a gas generating chamber 26. The high pressure gas is generated within the gas generating chamber 26, and thus the partitioning walls 23 and 24 and the upper and lower mirror plates 21 and 22 have a wall thickness sufficient to withstand such a high pressure. Also, as shown in FIG. 1, a plurality of gas flow paths 27 are formed in the inflator through to the partitioning wall 24, and a plurality of through openings 32 are formed through the circumferential wall 33 of the pressure vessel 20, to thereby introduce the gas generated in the gas generating chamber 26 into an air bag body associated with the inflator.

A filter 28 formed by stacking a plurality of metallic nets is disposed inside of the partitioning walls 23 and 24 and extends between the upper and lower mirror plates 21 and 22. Also, a filter 29 similarly formed by stacking a plurality of metallic nets and extending between a deflector plate 35 projecting from the inner periphery of the lower mirror plate 22 and the upper mirror plate 21, is disposed outside of the partitioning walls 23 and 24. The filters 28 and 29, collect the residual decomposition product and cool the high temperature gas, upon a generation of the gas. In the drawings, reference numeral 30 denotes an ignition device and 34 denotes an ignition material, both disposed within a space defined by an upper central fixing portion 38 integrally formed with the upper mirror plate 21 and formed with a plurality of through holes 40 and a lower central fixing portion 37 integrally formed with the lower mirror plate 22. The upper and lower central fixing portions 38 and 37 are welded together at the joint therebetween. Reference numeral 31 denotes a gas generating material.

An air bag to be installed in a vehicle must be made as compact and light weight as possible, and accordingly, the air bag body and the inflator must be made as compact and light weight as possible.

A first possible method of reducing the weight of the inflator is to reduce the number of metallic nets forming the filters, but a reduction of the number of the metallic nets forming the filters, but a reduction of the number of the metallic nets inevitably causes a lowering of filtering effect for the residual decomposition product and allows a leakage of the solid state residual decomposition product into the air bag body, to thus damage the air bag body. In the worst case, a serious problem can occur due an injury suffered by a passenger from a discharge of the high pressure gas due to a rupture of the air bag body. Accordingly, a reduction of the inflator weight by reducing the number of the metallic nets cannot be considered practical. If an attempt is made to reduce the weight by reducing the thickness of the upper and lower mirror plates of the pressure vessel, the upper and lower mirror plates may be distorted by the high pressure thereon, and thus the gas will flow through portions other than the predetermined gas flow paths. When such flow of the gas through portions other those predetermined occurs, a problem arises of an insufficient filtering and gas cooling.

Various inflators other than that illustrated in FIG. 1 have been disclosed in the art.

For example, U.S. Pat. No. 4,131,299 discloses an inflator having a metallic fiber layer provided at the inside of the openings of the pressure vessel, but an inner cylinder corresponding to the partitioning wall of the above-discussed U.S. Pat. No. 4,131,299, must be provided in the pressure vessel, giving rise to problems similar to those set forth above.

Japanese Unexamined Patent Publication (Kokai) No. 55-110642 discloses an inflator having a separately formed cartridge disposed within the pressure vessel. The partitioning wall provided for this inflator has a construction similar to that in the above-discussed U.S. Pat. No. 4,131,299, and when a deformation of the upper vessel body occurs, a gap is formed between the partitioning wall and the upper vessel body, to allow a gas leakage therefrom. This leads to the problem that the leaked gas is externally discharged without filtering.

Japanese Examined Patent Publication (Kokoku) No. 62-5094 discloses an inflator in which the mirror plates have a curved plane, thus permitting thinner wall thickness of the pressure vessel, but such construction leads to the problem of an increase in the size of the inflator due to an external bulging of the curved planes.

Japanese Unexamined Patent Publication (Kokai) No. 2-155857 and U.S. Pat. No. 4,530,516 disclose an inflator in which the partitioning wall is formed by locally deforming the mirror plate. Even in these inflators, however, there is no teaching of a solution to the leakage of high pressure gas through portions other than the predetermined gas flow paths when the upper and lower mirror plates are expandingly deformed.

As described above, in the conventional inflator constructions, the actuation thereof cannot be assured with a reduced size and weight.

SUMMARY OF THE INVENTION

An object of the present invention is to solve the problems found in the inflators known in the prior art and to obtain a compact size and lighter weight with a thinner thickness of the upper and lower mirror plates, by making it possible to allow an expanding deformation during the generation of gas without a leakage of the high pressure gas through portions other than the predetermined gas flow paths.

The object of the invention can be achieved by an inflator for an air bag which comprises a pressure vessel including an upper vessel body formed by a mirror plate and a cylindrical section extending downward from the peripheral edge of the mirror plate, a lower vessel body formed by a mirror plate and a cylindrical section extending upward from the peripheral edge of the mirror plate, the ends of the cylindrical sections of the upper and lower vessel bodies being welded together, and an essentially cylindrical partitioning wall provided within the pressure vessel for defining a gas generating chamber, a plurality of gas discharge paths provided through the partitioning wall for flowing generated gas, at least one through opening provided in one of the upper and lower vessel body for externally discharging the gas flowing out through the gas discharge paths, the partitioning wall being formed by an upper partitioning wall tightly fitted to the mirror plate of the upper vessel body and a lower partitioning wall tightly fitted to the mirror plate of the lower vessel body, the upper and lower partitioning walls being slidably overlapped at the mating ends thereof for a relative sliding movement.

Preferably, the upper vessel body and/or the lower vessel bodies are formed of a material deformable in response to the generated gas pressure, and the upper and lower partitioning walls are preferably formed through a press process.

Furthermore, preferrably the filters made from at least one of the metallic nets, knitted products or the like are provided on inner and outer sides of the partitioning wall. The filter provided inside of the partition covers the generated gas discharge paths even when the partitioning wall is expanded due to a deformation of the vessel.

Further, to arrange the filter to always cover the generated gas discharge paths, the filter can be given an expandable construction, or can be arranged to cover the inlet sides of the generated gas discharge paths, or alternatively, the distance between the inlet of the generated gas discharge path and the filter position can be made greater than the relative sliding stroke of the upper and lower partitioning walls.

Since the inflator according to the present invention is constructed to slidably overlap the mutually oppositing ends of the upper and lower partitioning wall, the upper and lower partitioning walls slides in the direction of the expansion while maintaining the engagement therebetween, even when the high pressure gas is generated within the gas generating chamber to expand the upper and lower mirror plates. Also, even when the upper and lower partitioning walls are expanded in the direction perpendicular to the axis of the inflator, the engagement therebetween can be maintained by the high pressure gas. Accordingly, a leakage of the gas through the portions other than the predetermined gas flow paths can be successfully prevented, and as a result, a filtering of the residual decomposition products and a desired cooling of the gas can be assured.

The inflator according to the present invention has an outer cell formed by the pressure vessel having a cylindrical structure with mirror plates at both ends. The thickness of the mirror plates can be reduced as they approach the form of a spherical mirror plate, but since the air bag for the driver seat must be compact, the height cannot be expanded. Therefore, a mirror plate having a form close to that of a substantially flat mirror plate is used. To prevent a deformation of such a flat mirror plate, the thickness must be very large (in a typical case where aluminum is used, 3 to 4.5 mm). Since the inflator according to the present invention permits a deformation of the flat mirror plate (deformation will not influence other characteristics), a remarkable advantage of an increased withstanding of pressure is obtained by permitting a deformation of the thin wall section of the mirror plate to a curved surface. This particular feature permits a thinner wall $\frac{2}{3}$ to $\frac{1}{3}$ the normal thickness at the deformation-permitted section, and results in a 40 to 70% reduction of the weight of the vessel.

As set forth above, since the mirror plate of the upper vessel body, the mirror plate of the lower vessel body, the upper partitioning wall, and the lower partitioning wall are constructed so as to achieve the desired function, i.e. a proper discharge of the gas, even when expanded by the gas pressure, the pressure vessel and the partitioning plate having a thin thickness can be obtained. Namely, since the pressure vessel and the partitioning wall can be formed of aluminum or another alloy having a low strength, light weight and large expandability, through a press process, a light weight inflator can be provided.

Furthermore, in the inflator having the construction according to the present invention, since a high strength material can be used, the thickness of the partitioning wall can be reduced, and therefore, the interior space of the pressure vessel can be effectively used to further contribute to a reduction of the weight of the inflator. Various materials can be used as the high strength material, but stainless steel is preferred.

BRIEF DESCRIPTION OF THE DRAWINGS

FIG. 3 is a perspective view of one example of a partitioning wall employed in the inflator according to the invention, in which FIG. 4 shows the condition of an engagement of the upper and lower partitioning walls employed in the inflator according to the invention, in which

DESCRIPTION OF THE PREFERRED EMBODIMENT

The present invention will be described in detail with reference to the accompanying drawings of one example of the inflator according to the present invention. Note, the present invention is not limited to the construction as shown in the accompanying drawings and described with reference to those drawings.

Figure 3A:
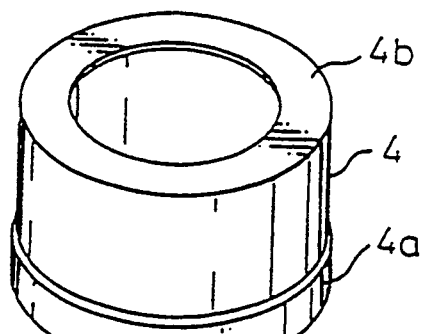
FIG. 3(A) shows an upper partitioning wall and FIG. 3(B) shows a lower partitioning wall.
Figure 3B:
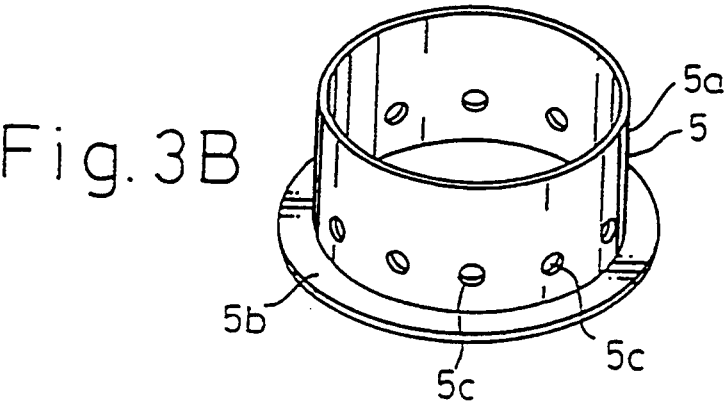
Figure 4A:
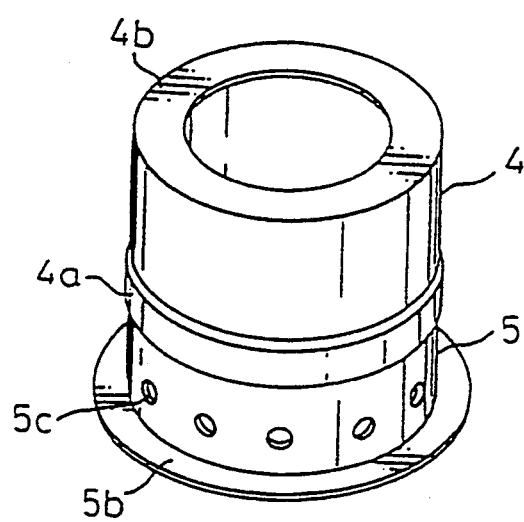
FIG. 4(A) is a perspective view of the engaged condition.
Figure 4B:
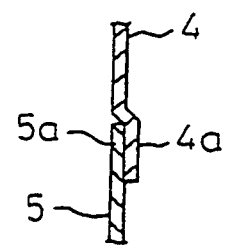
FIG. 4(B) is a section view of the engaged condition.

FIG. 3 shows one embodiment of the inflator according to the invention.

Figure 2:
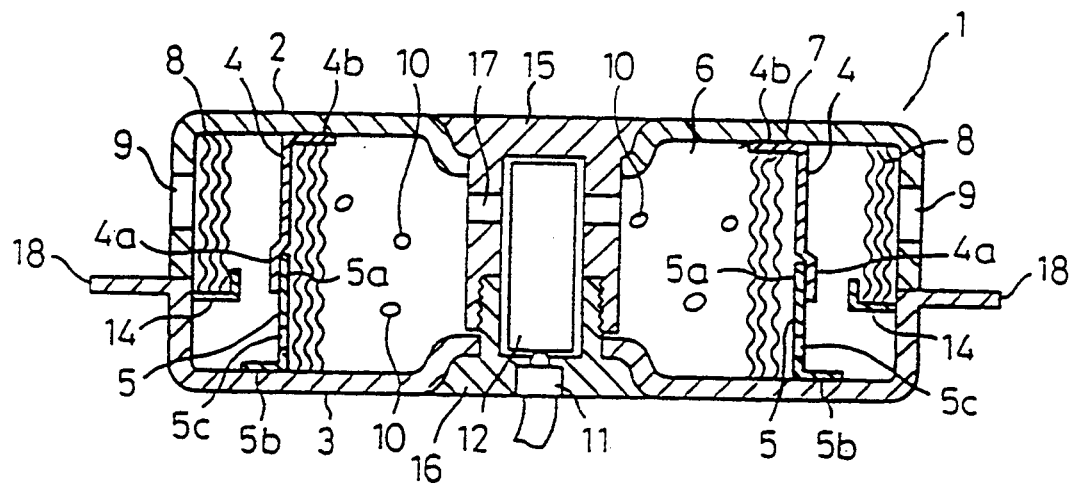
FIG. 2 is a section view of one embodiment of an inflator according to the present invention.

In FIG. 2, reference numeral 1 denotes a pressure vessel forming an inflator. The pressure vessel 1 includes an upper mirror plate 2 having a thin wall thickness and a cylindrical section, and a lower mirror plate 3 having a thin wall thickness similar to that of the upper mirror plate 2 and a cylindrical section. Reference numeral 4 denotes a cylindrical upper partitioning wall tightly fitted to the upper mirror plate 2, and reference numeral 5 denotes a cylindrical lower partitioning wall tightly fitted to the lower mirror plate 3 and engaging with the upper partitioning wall to thereby define a gas generating chamber 6. A mounting means for an air bag body is provided with a flange section 18 of a lower vessel body. The upper and lower mirror plates with the cylindrical sections form the upper and lower vessel bodies. The vessel is formed of aluminum or an aluminum based alloy having low strength, light weight, and large expandability.

The upper and lower partitioning walls 4 and 5 will be described with reference to FIGS. 2 and 3. A larger diameter section 4a is formed by radially outwardly expanding the cylindrical upper partitioning wall 4 from the intermediate position. The larger diameter section 4a is radially expanded to a dimension corresponding to the wall thickness of the lower partitioning wall 5. The upper partitioning wall 4 is formed with a flange 4b for rigidly securing same to the upper mirror plate 2. The external diameter of the lower partitioning wall 5 is substantially the same as the internal diameter of the upper partitioning wall 4. The lower partitioning wall 5 is formed with a plurality of gas flow paths 5c and is provided with a flange 5b to be fitted to the lower mirror plate 3. The flange 5b also may be formed as an inwardly extended flange.

The above-mentioned upper and lower partitioning walls 4 and 5 are arranged so that the flanges 4b and 5b are closely fitted to the upper and lower mirror plates 2 and 3. These members are assembled in such a the filter 7 formed of a plurality of layers of metal nets, and is discharged through the gas flow paths 5c formed at the lower portion of the lower partitioning wall 5. Then, the gas passes through the filter 8 and is discharged through the through opening 9 to expand the air bag body.

Due to the high pressure associated with the gas generation, the upper and lower mirror plates 2 and 3 forming the pressure vessel 1 are expanded, but as set forth above, since the upper and lower partitioning walls 4 and 5 are slidably engaged by inserting the end 5a of the lower partitioning wall 5 into the lower larger diameter section 4a of the upper partitioning wall 4 for sliding movement, and thus are freely movable against each other, this expandable portion permits a sliding movement of the end 5a of the lower partitioning wall 5 with respect to the larger diameter section 4a of the upper partitioning wall 4, while maintaining the engaged condition thereof.

As set forth above, in the present embodiment, when the high pressure gas is generated, a leakage of gas is not caused by an expansion of the mirror plates, since the upper and lower partitioning walls 4 and 5 forming the gas generating chamber 6 are constructed to be axially expandable.

Also, since the upper and lower partitioning walls 4 and 5, and the upper and lower mirror plates, can be formed of aluminum or an alloy thereof having a low strength but a high expandability, a light weight can be achieved without cracking during the pressing process. Furthermore, since the upper and lower mirror plates 2 and 3 can be formed with a thinner thickness, the pressure vessel becomes lighter in weight and can completely prevent gas leakage.

Although the larger diameter section 4a is formed with the upper partitioning wall 4, a similar effect can be obtained when the larger diameter section is manner that the end 5a of the lower partitioning wall 5 is arranged in the larger diameter section 4a of a lower portion of the upper partitioning wall 4, to overlap the ends 4a and 5a in a slidable fashion. By assembling both partitioning walls as set forth above, the gas generating chamber 6 is defined. It should be noted that, where the upper and lower partitioning walls are rigidly fixed by welding, the flanges 4b and 5b become unnecessary.

Reference numeral 7 denotes a filter disposed within the gas generating chamber 6 along the partitioning walls 4 and 5, and formed by piling metallic nets or by a material obtained by pressing a knitted fabric of metal wire. Reference numeral 8 denotes a filter for covering openings 9 formed through the side wall of the pressure vessel 1, and extending between the upper mirror plate 2 and a deflecting plate 14. Reference numeral 10 denotes a gas generating material containing metal azide as a main component, and reference numeral 11 denotes an ignition device, and 12 denotes an ignition material.

The ignition material 12 is positioned within a space defined by a central fixing member 15 having a plurality of holes 17 and a fastening member 16. The central fixing member 15 and the fastening member 16 are made of an aluminum alloy and threadedly engaged with each other to be positioned at the center of the inflator and withstand pressure, and thus increase the strength of the pressure vessel. Note, the filter can be arranged below the deflecting plate 14.

The shown embodiment constructed as set forth above is operated by actuating the ignition device 11 to thereby fire the ignition material to cause a decomposition at a high temperature of the gas generating material containing the metallic azide as the main component, to thus rapidly generate the nitrogen gas. The gas thus generated passes through formed at the upper portion of the lower partitioning wall section 5. Also, substantially the same effect can be obtained regardless of the condition of the ends of the upper and lower partitioning walls. The essential point is that the upper and lower partitioning walls form an expandable section.

Figure 1:
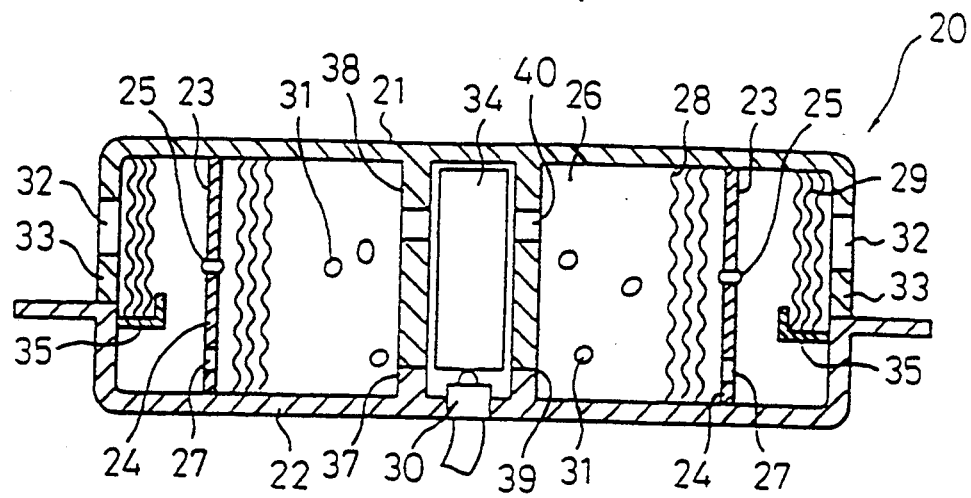
FIG. 1 is a section view of one example of the conventional inflator.

Next, with respect to the inflator having a diameter of 100 mm and a height of 40 mm, a comparison of the weight is made between the pressure vessel (pressed product of aluminum alloy with 2 mm wall thickness) of the inflator of the present invention as shown in FIG. 2 and the pressure vessel (formed product of aluminum with 3.6 mm wall thickness) of the conventional inflator of FIG. 1. The conventional pressure vessel weighed 360 g, but the pressure vessel of the present invention weighed 220 g. Therefore, a 61% reduction in weight was obtained.

Furthermore, the conventional inflator (excluding the ignition material) having the filter provided internally, has a weight in a range of 590 g to 780 g. Conversely, the inflator according to the invention having the structure of FIG. 2 has a weight of 490 g.

FIELD OF INDUSTRIAL APPLICATION

The inflator having the construction according to the present invention can be formed in a compact size and with a light weight, while ensuring a complete collection of the residual decomposition products and a cooling of the generated gas, and accordingly, is useful as an inflator for an air bag for various vehicles.

I claim:

1. An inflator for an air bag which comprises:
    a pressure vessel including an upper vessel body formed by a mirror plate and a cylindrical section extending downward from the peripheral edge of said mirror plate, a lower vessel body formed by a mirror plate and a cylindrical section extending upward from the peripheral edge of said mirror plate, the ends of said cylindrical sections of said upper and lower vessel bodies being welded to each other, and
    an essentially cylindrical partitioning wall provided within said pressure vessel for defining a gas generating chamber wherein high pressure gas is generated to inflate said air bag,
    a plurality of gas discharge paths defined through said partitioning wall for allowing a flow of generated gas, and
    at least one through opening defined in one of said upper and lower vessel bodies for externally discharging the gas flowing through said gas discharge paths,
    wherein said partitioning wall is formed by an upper partitioning wall having a proximal end tightly fitted to said mirror plate of said upper vessel body and a lower partitioning wall having a proximal end tightly fitted to said mirror plate of said lower vessel body, and
    said upper and lower partitioning walls each having a distal end, one of said distal ends being formed with a diameter slightly larger than the diameter of the other distal end such that the upper and lower partitioning walls mate with one another at said distal ends and slidably move relative to one another upon being subjected to the pressure created by generation of said high pressure gas, said mating distal ends not being physically connected to one another and having a clearance therebetween to facilitate said sliding movement.

2. An inflator for an air bag as set forth in claim 1, wherein at least one of said upper vessel body and said lower vessel body are formed of a material deformable in response to the generated gas pressure.

3. An inflator for an air bag as set forth in claim 1, wherein said upper and lower partitioning walls are formed through a pressing process.

4. An inflator for an air bag as set forth in claim 1, wherein filters made from at least one metallic net are provided on inner and outer sides of said partitioning wall, the filter provided at the inside of said partition covering said generated gas discharge paths even when said partitioning wall is extended due to a deformation of said vessel.

* * * * *